(12) United States Patent
Rudd et al.

(10) Patent No.: US 7,181,601 B2
(45) Date of Patent: Feb. 20, 2007

(54) METHOD AND APPARATUS FOR PREDICTION FOR FORK AND JOIN INSTRUCTIONS IN SPECULATIVE EXECUTION

(75) Inventors: Kevin W. Rudd, Portland, OR (US); Tin-Fook Ngai, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 10/731,567

(22) Filed: Dec. 8, 2003

(65) Prior Publication Data

US 2005/0125645 A1 Jun. 9, 2005

(51) Int. Cl.
*G06F 9/38* (2006.01)
(52) U.S. Cl. ...................................... 712/239
(58) Field of Classification Search ................. 712/239
See application file for complete search history.

(56) References Cited

U.S. PATENT DOCUMENTS 6,052,769 A * 4/2000 Huff et al. ..................... 712/3
6,466,226 B1 * 10/2002 Watson et al. ............... 345/610
6,574,725 B1 * 6/2003 Kranich et al. ................ 712/31
6,684,398 B2 * 1/2004 Chaudhry et al. ........... 718/106
6,687,812 B1 * 2/2004 Shimada ...................... 712/230

OTHER PUBLICATIONS

Intel Corporation, "Intel® Itanium® Architecture Software Developer's Manual—vol. 3: Instruction Set Reference", Revision 2.1, Document No. 245319-004, pp. 16-29, Oct. 2002.

* cited by examiner

*Primary Examiner*—William M. Treat
(74) *Attorney, Agent, or Firm*—Blakely, Sokoloff, Taylor & Zafman

(57) ABSTRACT

A method and apparatus for enabling the speculative forking of a speculative thread is disclosed. In one embodiment, a speculative fork instruction is conditioned by the results of a fork predictor. The fork predictor may issue predictions as to whether or not a speculative thread would execute desirably. The fork predictor may be implemented as a modified branch predictor circuit, and may have execution history updates entered by a determination of whether or not the execution of a speculative thread was or would have been desirable.

24 Claims, 7 Drawing Sheets

| PROCESSOR TYPE | SPECULATION PREDICTED TO BE SUCCESSFUL OR DESIRABLE | FORK? | JOIN? | SPECULATION POTENTIALLY SUCCESSFUL OR DESIRABLE | UPDATE PREDICTOR? |
|---|---|---|---|---|---|
| NON-SUPPORTING | N/A | NO OPERATION | NO OPERATION | N/A | NO OPERATION |
| SUPPORTING | NO | NO OPERATION | NO OPERATION | COMPLETE VALUE | UPDATE |
| SUPPORTING | YES | FORK | JOIN | COMPLETE VALUE | UPDATE |

FIG. 3

```
main_routine()
{
    initialize_main_compute();
fork_point:
    fork_executed = fork (speculative_routine, join_point);
    main_pre_join_point_compute();
join_point:
    if (fork_executed) join_nonspeculative(speculative_routine, join_point);
post_speculation_point:
    speculation_status = determine_speculation_status();
    speculative_results_valid   = (fork_executed && successful(speculation_status));
    speculative_computation_desirable = desirable(speculation_status);
    if (speculative_results_valid) consume_speculative_results();
    else                           compute_nonspeculative_results();
    update(fork_point, speculative_computation_desirable);
    complete_main_compute();
}
speculative_routine(join_point)
{
    initialize_speculative_compute();
    compute_speculative_results();
    join_speculative(speculative_routine, join_point);
}
```

FIG. 4A

METHOD AND APPARATUS FOR PREDICTION FOR FORK AND JOIN INSTRUCTIONS IN SPECULATIVE EXECUTION

FIELD

The present disclosure relates generally to microprocessors, and more specifically to microprocessors capable of speculative execution.

BACKGROUND

Modern microprocessors may support multi-threaded operation in their architectures. In some cases the multi-threaded operation may be sequential multi-threading, and in other cases the multi-threaded operation may be parallel multi-threading. In either case there are situations where a new thread may need to be spawned or where an existing thread may need to be merged back into the thread that spawned it originally. The process of spawning a new thread may be called a fork operation, and the process of merging a thread back may be called a join operation. Fork and join operations may be coded in an operating system, or alternatively may be placed in executable code by the use of hardcoded fork and join instructions. The rationale for using fork and join operations is to increase performance by the use of the forked-off threads. In some cases the forked thread may be part of non-speculative execution, but in other cases the forked thread may be speculative.

The use of hardcoded fork and join instructions may impact performance in several ways. If the instruction execution in the forked-off thread is correct and if the processor resources are not inadvertently impacted by the forked-off thread, then the performance may be improved. However, if the instruction execution in the forked-off thread is incorrect, or if the processor resources are adversely impacted by the forked-off thread, then the performance may be reduced. It may be possible to consider the execution of a forked-off thread "desirable" in several different ways. It could be if the forked-off thread executed successfully. It could be if the overall processor execution throughput was enhanced. It could be a combination of these two, or it could take into account other measures of desirability.

Software execution could be used to determine whether it would be advantageous to take the fork or not. However, this determination would need to be accomplished prior to the fork, essentially occupying the resources available for both the main thread and the forked-off thread. The use of software determination of whether it would be advantageous to take the fork may use sufficient resources to impact processor performance by itself.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a table showing operations in supporting and non-supporting processors, according to one embodiment of the present disclosure.

FIGS. 4A and 4B are a code fragment example and a flowchart of a method for speculative threads executing in a processor, according to one embodiment of the present disclosure.

DETAILED DESCRIPTION

The following description describes techniques for a processor using multi-threaded execution to conditionally execute fork and join instructions without the use of extensive software testing prior to the execution of the fork. In the following description, numerous specific details such as logic implementations, software module allocation, bus signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of an Itanium® Processor Family (IPF) processor or in a Pentium® family processor such as those produced by Intel® Corporation. However, the invention may be practiced in other kinds of processors that may wish to use conditional fork and join instructions in a multi-threaded environment.

Figure 1:
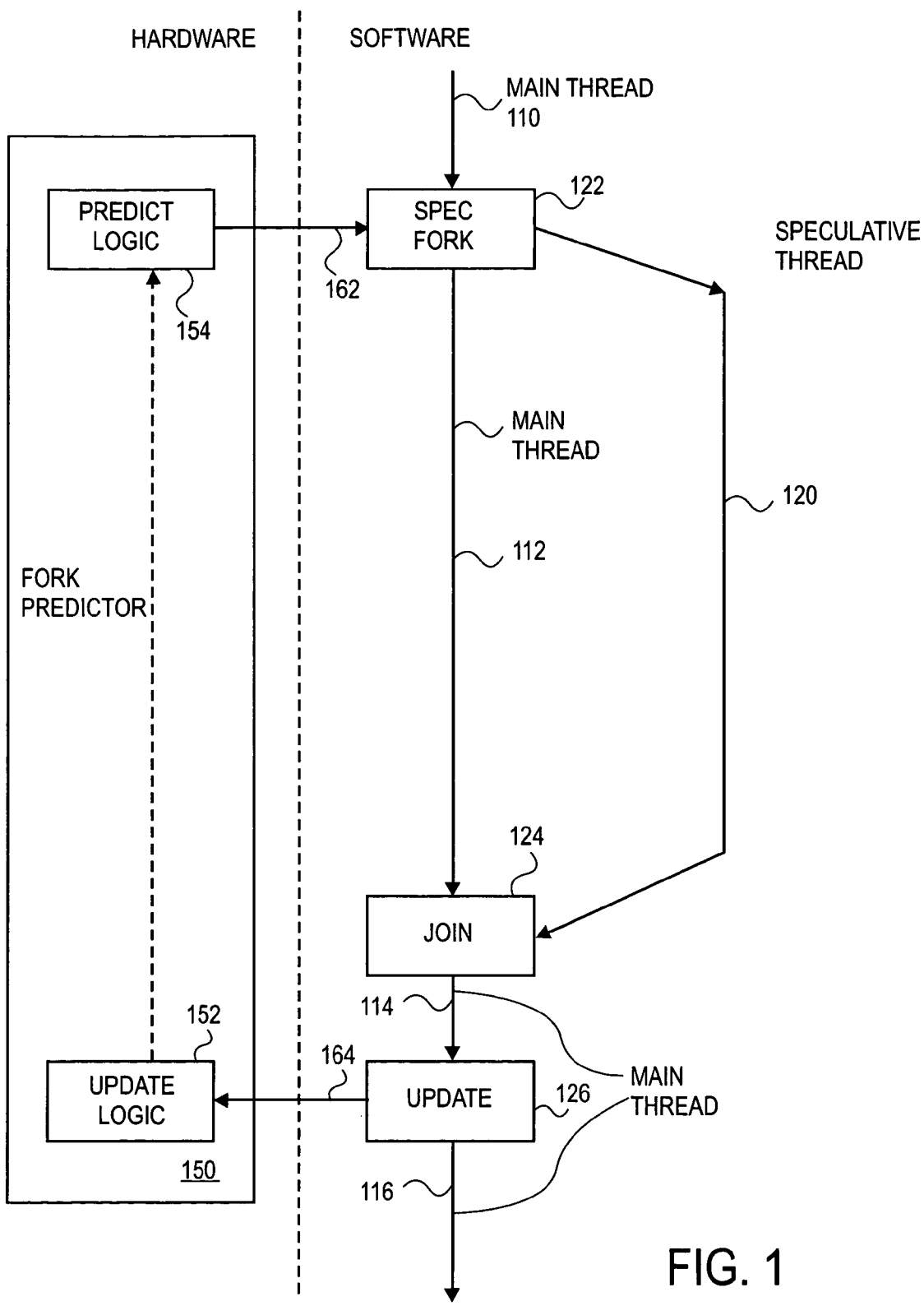
FIG. 1 is a diagram showing the operation of a fork predictor supporting a speculative thread executing on a processor, according to one embodiment.

Referring now to FIG. 1, a diagram showing the operation of a fork predictor supporting a speculative thread executing on a processor is shown, according to one embodiment. In the FIG. 1 embodiment, actions involving software occur on the right hand side of the figure while actions involving hardware occur on the left hand side of the figure. In other embodiments, the allocation of functions between software and hardware may be performed differently.

As execution proceeds in the main thread 110, a speculative fork instruction 122 may be reached. In various embodiments, speculative fork instruction 122 may be placed in the software by a compiler or by hand under a programmer's direction. Speculative fork instruction 122 may have the effect, if executed, of initiating the spawning of a speculative thread 120. The speculative fork instruction 122 may be under the control of a fork predictor 150, which may issue a prediction concerning any particular iteration of speculative fork instruction 122. When the speculative fork instruction 122 reaches the processor's execution units, the speculative fork instruction 122 may or may not be executed depending upon the prediction issued by fork predictor 150. If the prediction is that the speculative thread will be desirable, then speculative fork instruction 122 is executed, the main thread proceeds along 112 and in addition a speculative thread 120 is spawned. If, however, the prediction is that the speculative thread will not be desirable, then speculative fork instruction 122 is not executed, and the main thread proceeds along 112.

If the speculative thread 120 is spawned, at a certain later time it may merge back into the main thread 112. In one embodiment a join instruction 124 may be used to effect the joining of speculative thread 120 back into the main thread 112. In one embodiment, join instruction 124 may wait until both main thread 112 and speculative thread 120 have finished current processing before effecting the join. (Not shown are time-out exceptions for those cases where either the main thread 112 or speculative thread 120 are unable to finish current processing due to coding or system errors.) If the fork was executed and successful, then the main thread 14, 116 may consume the results computed by the speculative thread 120.

Before the time that the main thread reaches the update instruction 126, it may be determined whether the execution of the speculative thread was successful. In one embodiment, "successful" may be equivalent to having executed correctly. This determination may take place in the main thread 110, 112, 114, in the speculative thread 120, or as part of a join instruction 124. If the execution of the speculative thread 120 was successful, then the main thread may progress without intervention. However, if the execution of the speculative thread 120 was not successful, then the results of the execution of the speculative thread 120 may be discarded and a recovery process may be initiated.

It may be possible to consider the forking of speculative thread 120 "desirable" in several different ways. It could be considered desirable if speculative thread 120 executed successfully, or would have executed successfully if it had been forked. It could be considered desirable if the overall processor execution throughput was enhanced, even in those cases where the associated execution of the speculative thread was determined not to be successful (e.g. the speculative thread could have advantageously made certain cache loads). It could be considered desirable if a combination of these two were present, or it could take into account other measures of desirability. This determination may be performed by an update instruction 126 or instructions, which in one embodiment may be a separate instruction and in another embodiment may be part of the join instruction 124. In either case, the update instruction 126 may send the results of the determination of whether the execution of the speculative thread was desirable or not over an update signal path 164 to an update logic 152 in fork predictor 150. The update logic 152 may send these results on to the prediction logic 154 as part of the history information required by prediction logic 154 to make predictions.

If the speculative thread 120 is not spawned, the main thread 112 may progress on by itself. In one embodiment, when the main thread 112 reaches the join instruction 124 it may treat the join instruction 124 as a no-operation (nop) in the absence of an executing speculative thread. In this case, prior to the update instruction 126, the main thread 110, 112,114 may determine whether the execution of the speculative thread 120 would have been desirable if it had been executed. This determination of being desirable may again be performed by an update instruction 126 or instructions, which in one embodiment may be a separate instruction and in another embodiment may be part of the join instruction 124. In other embodiments, the determination of whether the execution of the speculative thread 120 would have been desirable may be made individually or separately and one determination may be made without the other. The update instruction 126 may send the results of the determination of whether the execution of the speculative thread would have been desirable or not over an update signal path 164 to update logic 152 in fork predictor 150. The update logic 152 may send these results on to the prediction logic 154 as part of the history information required by prediction logic 154 to make predictions.

The prediction logic 154 may be one of various well-known branch predictor circuits adapted for use in predicting the outcome of speculative threads. In differing embodiments, prediction logic 154 may implement prediction algorithms and methods well-known in the art such as a local history or a global history prediction algorithms. In other embodiments, other prediction algorithms specifically designed for speculative fork prediction may be used. One modification to such branch predictor circuits arises because the true results of a branch are automatically available to feed back into the predictor when the corresponding branch instruction is actually executed. Since the speculative thread 120 is a series of instructions, such feedback is not automatically available as the product of either the fork (where the prediction is made) or the join. This requires that the determination of whether the execution of the speculative thread was successful or not be separately made. In one embodiment, as mentioned previously, the determination may be performed by an update instruction 126 or instructions, which in one embodiment may be a separate instruction and in another embodiment may be part of the join instruction 124. The prediction logic 154 may be informed of the results of the determination by the update logic 152. In some cases, the update may never occur, and the prediction logic 154 may or may not take this fork prediction into account for subsequent predictions.

Figure 2:
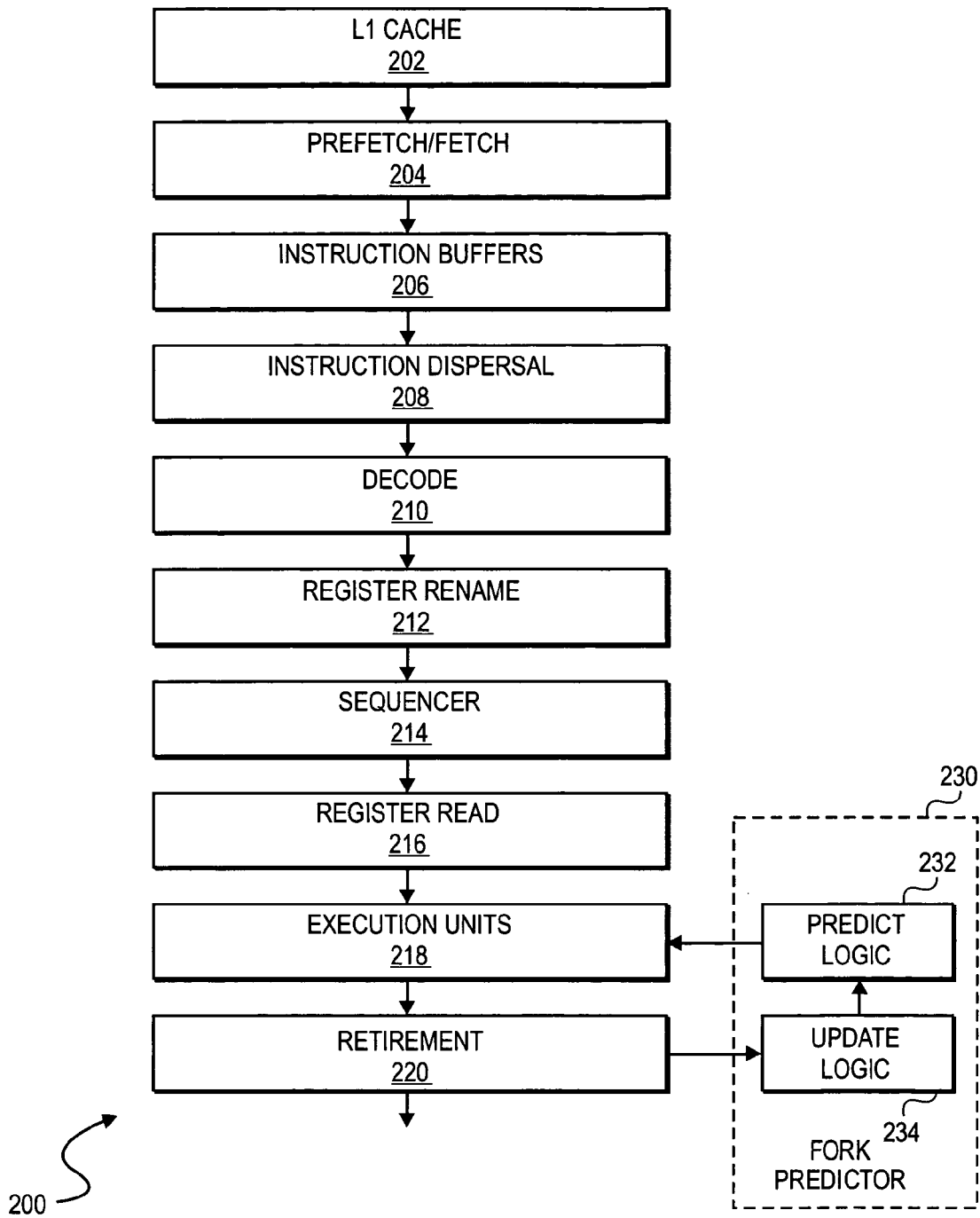
FIG. 2 is a schematic diagram of portions of a pipeline of a processor including a fork predictor, according to one embodiment.

Referring now to FIG. 2, a schematic diagram of portions of a pipeline of a processor 200 including a fork predictor 230 is shown, according to one embodiment. Instructions may be fetched or prefetched from a level one (L1) cache 202 by a prefetch/fetch stage 204. These instructions may be temporarily kept in one or more instruction buffers 206 before being sent on down the pipeline by an instruction dispersal stage 208. A decode stage 210 may take one or more instructions from a program and produce one or more machine instructions. After exiting the decode stage 210, the instructions may enter the register rename stage 212, where instructions may have their logical registers mapped over to actual physical registers prior to execution. Upon leaving the register renaming stage 212, the machine instructions may enter a sequencer 214. In one embodiment, the sequencer 214 may schedule the various machine instructions for out-of-order execution based upon the availability of data in various source registers, or of data from some other source such as, for example, a results bypass network. In another embodiment, sequencer 214 may simply schedule the various machine instructions for in-order execution. Upon leaving the sequencer 214, the physical source registers may be read in register read file stage 216 prior to the machine instructions entering one or more execution units 218.

The execution units 218 may be configured to receive an input signal from a prediction logic 232 of a fork predictor 230. The execution of a speculative fork instruction may be conditioned by the prediction given by prediction logic 232: the speculative fork instruction may be executed if the prediction logic 232 predicts that the speculative thread initiated by the speculative fork instruction will be desirable, and the speculative fork instruction may not be executed if the prediction logic 232 predicts that the speculative thread initiated by the speculative fork instruction will not be desirable. This behavior may be contrasted with a conditional non-speculative fork instruction, where the conditional non-speculative fork instruction may or may not have its execution retired depending upon a predicate value which was externally determined and written but not affected by the fork prediction.

After execution in execution units 218, the results of the machine instructions may, in a retirement stage 220, update the machine state and write to the physical destination registers depending upon the resolved state of the corresponding predicate values. In one embodiment, a main thread may determine whether the execution of a speculative thread was desirable. This determination of desirability may be performed by an update instruction or instructions. The update instruction at retirement stage 220 may send the results of the determination of whether the execution of the speculative thread was desirable or not to an update logic 234 in fork predictor 230. The update logic 234 may send these results on to the prediction logic 232 as part of the history information required by prediction logic 232 to make predictions.

If the speculative thread had not been spawned, the main thread may progress on by itself. In one embodiment, prior to the time of an update instruction, the main thread may determine whether the execution of the speculative thread would have been desirable if it had in fact been executed. This determination may again be performed by an update instruction or instructions, which in one embodiment may be a separate instruction and in another embodiment may be part of the join instruction. The update instruction at retirement stage 220 may send the results of the determination of whether the execution of the speculative thread would have been desirable or not to update logic 234 in fork predictor 230. The update logic 234 may send these results on to the prediction logic 232 as part of the history information required by prediction logic 232 to make predictions.

The pipeline stages shown in FIG. 2 are for the purpose of discussion only, and may vary in both function and sequence in various processor pipeline embodiments. Similarly the connections of fork predictor 230 to the pipeline stages may vary in various embodiments. In some embodiments fork predictor 230 may be part of a branch prediction circuit. In other embodiments, fork predictor 230 may be implemented as an independent structure.

Referring now to FIG. 3, a table showing operations in supporting and non-supporting processors is shown, according to one embodiment of the present disclosure. In order to facilitate use of common software in processors of differing configurations, the common software should be capable of executing on supporting processors that implement a speculative fork instruction and also on non-supporting processors that do not. In one embodiment a non-supporting processor could trap on the non-implemented speculative fork instruction and handle the situation as an exception. However, this would consume valuable time and processor resources. Therefore, in another embodiment the software should test for the presence or absence of support prior to attempting the execution of the speculative fork instruction.

FIG. 3 shows one embodiment of three possible cases when executing a code sequence (such as that shown in FIG. 4A below) in either a supporting or a non-supporting processor. In the non-supporting processor, the speculative fork, join, and update instructions may be executed as nops. In the supporting processor, whether or not the speculative thread was in fact forked, the determination of whether the speculative thread was or would have been desirable may be made and the update to the fork predictor may be made.

Referring now to FIG. 4A, a code fragment example is shown, according to one embodiment of the present disclosure. The code fragment example has a main routine that performs two sets of computations: the computation that will be performed in a main thread in parallel with a speculative thread and the post-speculation computation that consumes the results of the earlier computation. The speculative computation may simplify the main computation and may enable execution of the post-speculation computation much earlier than would be possible with the non-speculative form of this code, thus shortening the critical path through this code in the event that the speculation is successful.

Figure 4B:
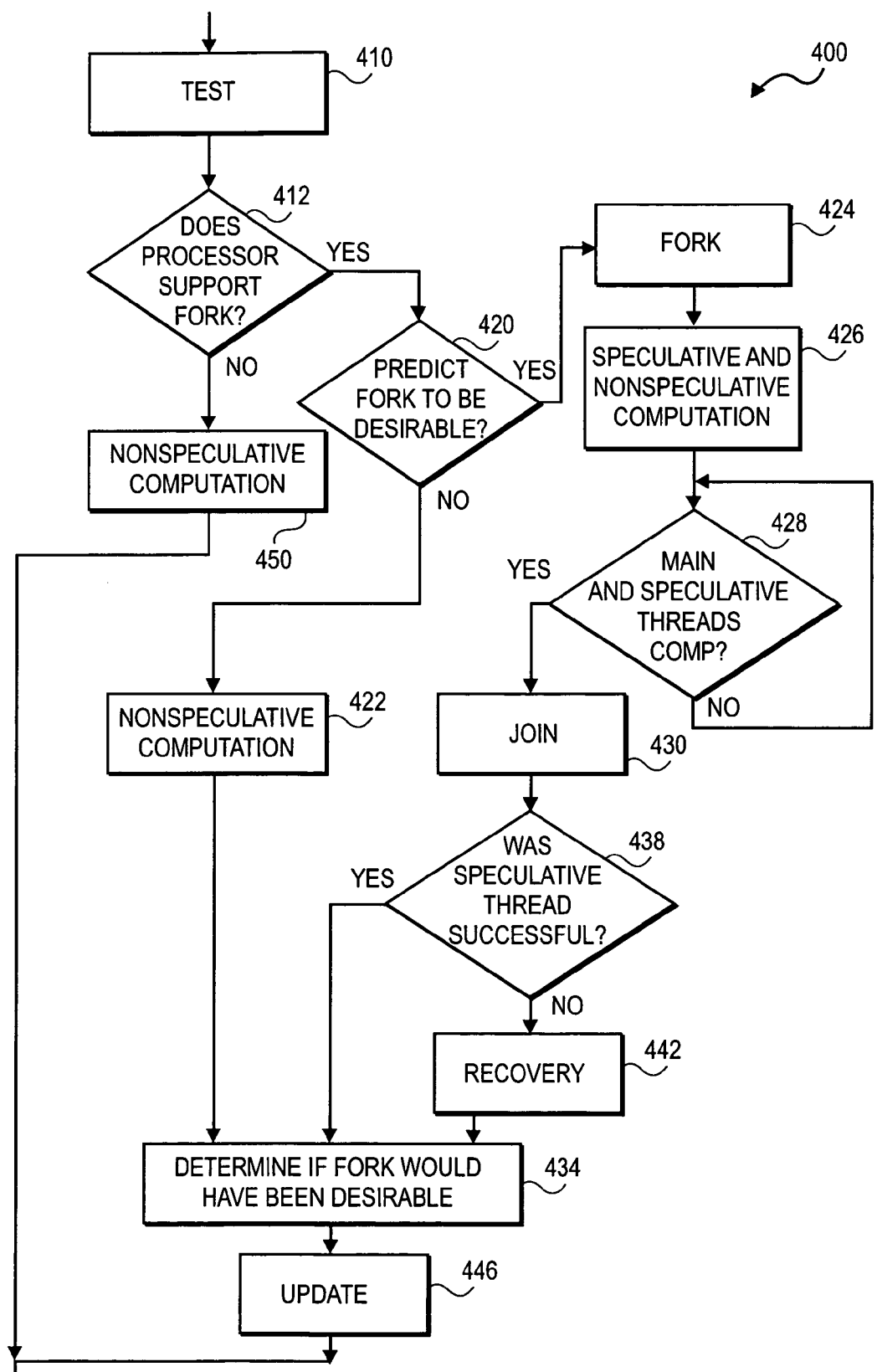

Referring now to FIG. 4B, a flowchart of a method for speculative threads executing in a processor is shown, according to one embodiment of the present disclosure. The process 400 may begin with a test instruction 410. The test instruction 410 may in various embodiments consist of reading a processor identification register or may consist of a specialized test instruction. After executing the test instruction 410 the process enters decision block 412, where it may be determined whether or not the processor supports the speculative fork instruction. If not, the process exits via the NO path and exits the process. If so, then the process exits via the YES path and enters decision block 420.

In decision block 420 it may be determined whether the fork predictor issues a prediction that it would be desirable to execute a speculative thread. If not, then the process exits via the NO path, and in block 434 determines whether the speculative thread would in fact have been desirable before updating the fork predictor with this result in block 446. If, however, the fork predictor issues a prediction that it would be desirable to execute the speculative thread, the process exits via the YES path and in block 424 spawns off a speculative thread via a speculative fork instruction before entering decision block 428.

In decision block 428 it may be determined if both the main thread and the speculative thread have executed to completion before a join instruction. If not, then the process exits via the NO path and decision block 428 repeats. When both the main and speculative threads have executed to completion, then the process exits via the YES path and in block 430 the join instruction is executed before entering decision block 438. (Not shown are time-out exceptions for those cases where either the main thread or speculative thread is unable to execute to completion due to coding or system errors.)

In decision block 438 it may be determined whether the speculative thread was executed successfully. If so, then the process exits via the YES path, and in block 434 determines whether the speculative thread would in fact have been desirable before updating the fork predictor with this result in block 446. If not, then the process exits via the NO path and initiates a recovery in block 442. Then in block 434 the process determines whether the speculative thread would in fact have been desirable before updating the fork predictor with this result in block 446.

An example of instructions that may be used in the FIG. 4B process executing on an Itanium® family or compatible processor is as follows. For the test block 410, it may be possible to use a "test feature" tf instruction, to gate the speculative fork instruction and thereby avoid trapping and exception handling on non-supporting processors. The code line tf p1, p0=@fork would set the predicate p1 true on supporting processors and false on non-supporting processors. If speculative forking is available, then the modified branch instruction br.fork could be used as the speculative fork instruction as in the code lines forkpoint:
   (p1) br.fork.spec speculative_routine whose execution would be suppressed if predicate p1 is false. (The speculative fork may be made conditional by merging another condition with the br.fork.spec qualifying predicate p1. For example, (p1) cmp.unc p1, p0=r0, r2. This may ensure that if p1 is already false that it will propagate to its result and force it to be false as well.) The join instruction could be implemented using a nop with hint which is just a nop if the @join hint is not supported. This could be expressed as in the code lines join_point:
nop.hint @join for use in the FIG. 4B process. In other embodiments, the join instruction could be implemented as a new instruction in branch predict/hint space where undefined operations are ignored. The determination of whether the speculative thread was or would have been desirable could be implemented with a compare/equal/unconditional cmp.eq.unc instruction as in the following code line:

(p1) cmp.eq.unc p0, p3=r0, r1 where the cmp instruction would check the result of the desirability computation in register r1 and sets predicate p3 true if the speculative thread was or would have been desirable and false otherwise. A similar compare could determine whether the speculative thread was successfully executed. In other embodiments, other code sequences that compute whether or not the speculative thread was or would have been successful could be used. The update instruction could be implemented as a modified branch predict brp.join instruction as in the following code line:

(p3) brp.join speculative_routine, fork_point which is ignored if not implemented because it is in a portion of branch prediction/hint space where undefined operations are simply ignored.

Figure 5A:
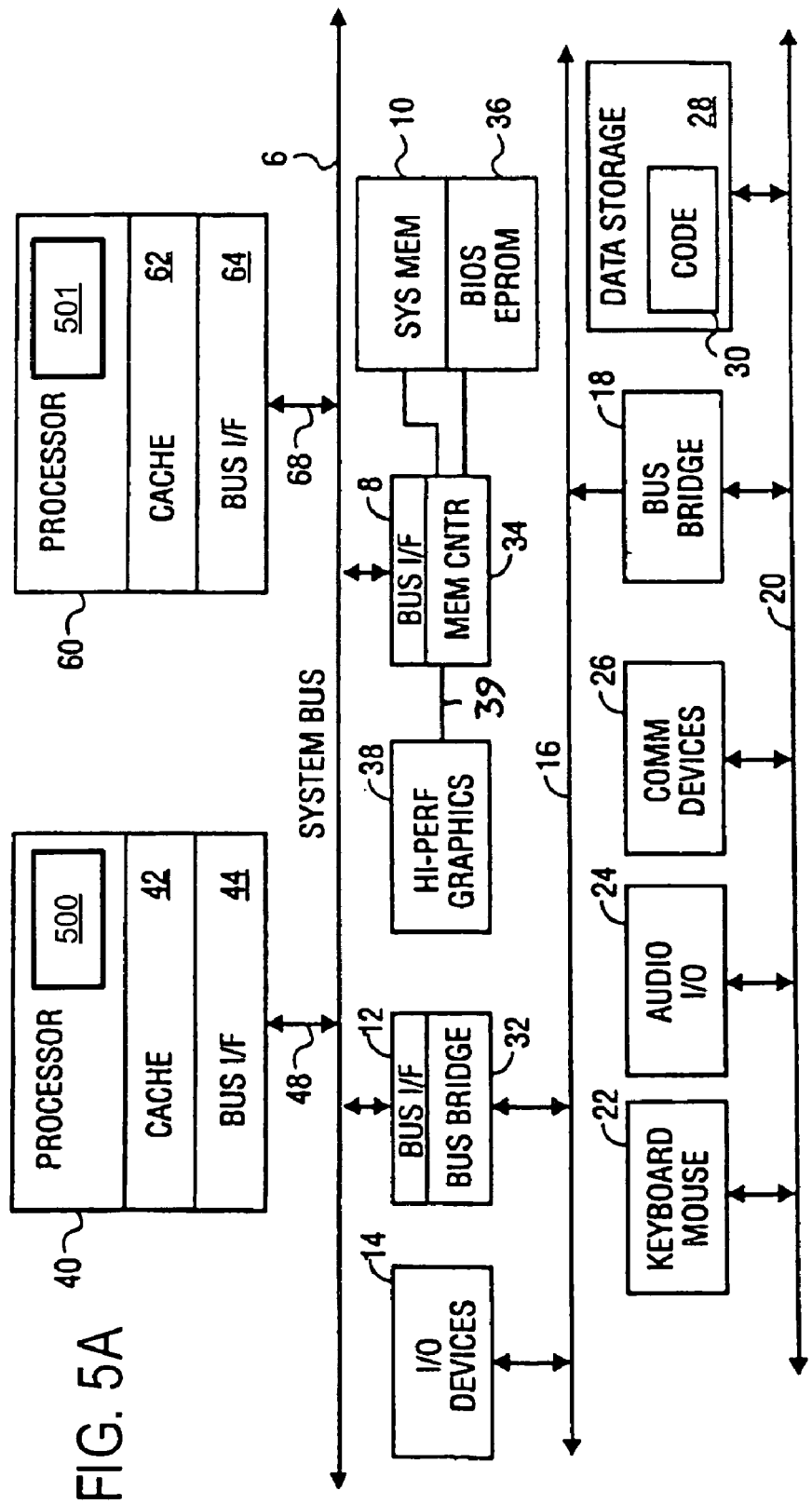
FIGS. 5A and 5B are schematic diagrams of systems including a processor supporting execution of speculative threads, according to two embodiments of the present disclosure.
Figure 5B:
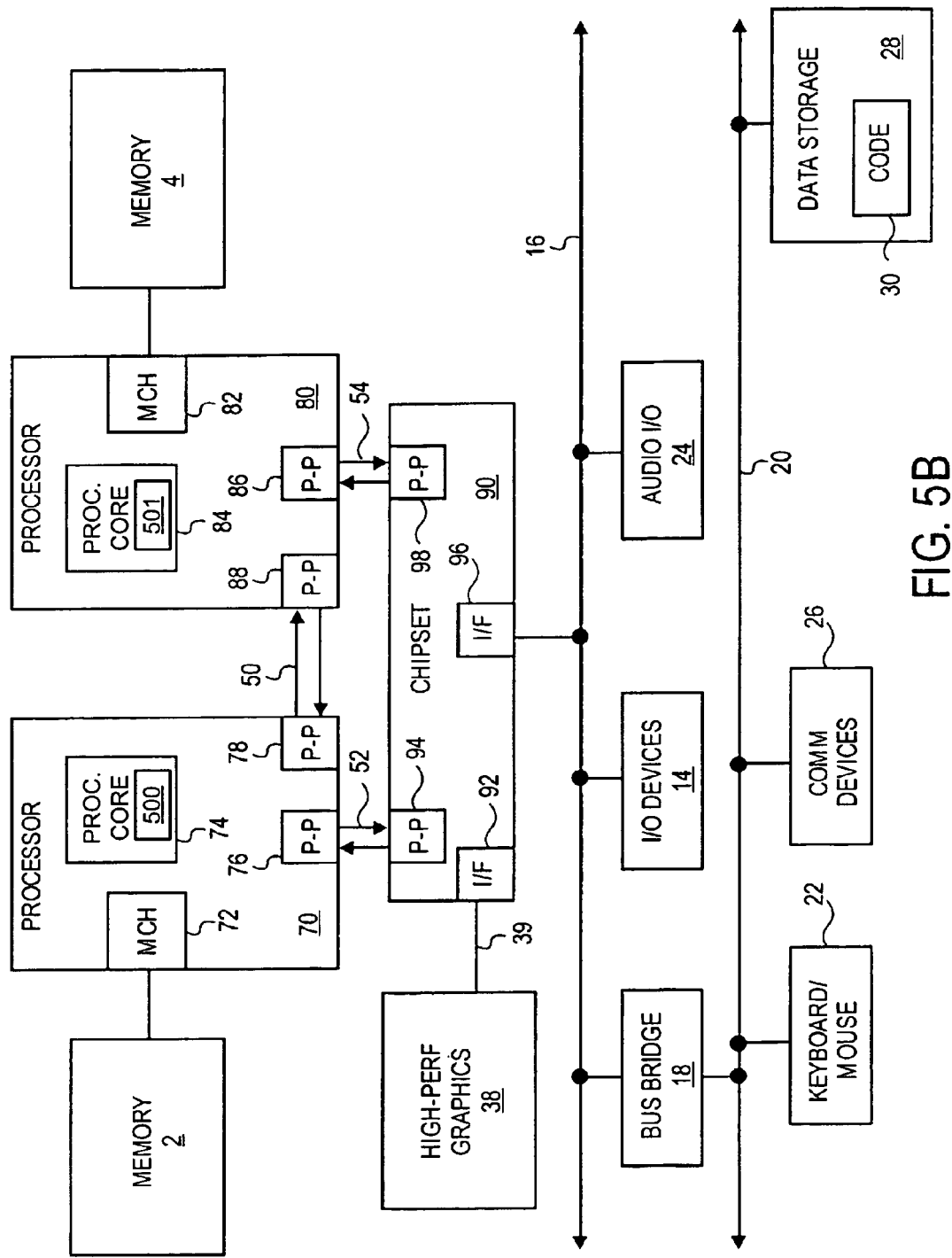

Referring now to FIGS. 5A and 5B, schematic diagrams of systems including a processor supporting execution of speculative threads are shown, according to two embodiments of the present disclosure. The FIG. 5A system generally shows a system where processors, memory, and input/output devices are interconnected by a system bus, whereas the FIG. 5B system generally shows a system were processors, memory, and input/output devices are interconnected by a number of point-to-point interfaces.

The FIG. 5A system may include several processors, of which only two, processors 40, 60 are shown for clarity. Processors 40, 60 may include level one caches 42, 62, and fork predictors 500 and 501. Fork predictors 500 and 501 are configured similarly to the fork predictors described above with respect to fork predictors 150 and 230, and are configured to perform embodiments of the method described herein. The FIG. 5A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other buses may be used. In some embodiments memory controller 34 and bus bridge 32 may collectively be referred to as a chipset. In some embodiments, functions of a chipset may be divided among physical chips differently than as shown in the FIG. 5A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory or other memory devices. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct read data from system memory 10 to the high-performance graphics circuit 38 across high-performance graphics interface 39.

The FIG. 5B system may also include several processors, of which only two, processors 70, 80 are shown for clarity. Processors 70, 80 may each include a local memory channel hub (MCH) 72, 82 to connect with memory 2, 4. Processors 70, 80 include fork predictors 500 and 501. Fork predictors 500 and 501 are configured similarly to the fork predictors described above with respect to fork predictors 150 and 230, and are configured to perform embodiments of the method described herein. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 5A system, bus bridge 32 may permit data exchanges between system bus 6 and bus 16, which may in some embodiments be a industry standard architecture (ISA) bus or a peripheral component interconnect (PCI) bus. In the FIG. 5B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor, comprising:
a fork predictor to issue a prediction whether a fork instruction should be permitted to execute, wherein said fork predictor includes prediction logic to issue said prediction based upon execution history of speculative threads, wherein said fork predictor includes update logic to receive a first calculated determination whether a first one of said speculative threads was executed desirably, and wherein said first calculated determination is performed by executing an update instruction; and an execution unit to execute said fork instruction responsive to said prediction.

2. The processor of claim 1, wherein said prediction logic utilizes local history of said speculative threads.

3. The processor of claim 1, wherein said prediction logic utilizes global history of said speculative threads.

4. The processor of claim 1, further comprising a retirement unit to transfer said first calculated determination to said update logic.

5. The processor of claim 1, wherein said update logic is to receive a second calculated determination whether a second one of said speculative threads would have been executed desirably when said second one of said speculative threads was not executed.

6. The processor of claim 1, wherein said update instruction is part of a join instruction.

7. A method, comprising:
predicting whether a speculative thread will be desirable;
conditionally forking to initiate said speculative thread responsive to said predicting;
determining whether said speculative thread was desirable;
updating state performing said predicting with results of said determining; and
testing whether a processor supports said conditional forking.

8. The method of claim 7, further comprising joining said speculative thread and a master thread when said speculative thread and said master thread are both complete.

9. The method of claim 8, wherein said joining is performed with said updating.

10. The method of claim 7, wherein said determining includes determining whether a non-executed speculative thread would have been desirable.

11. The method of claim 7, wherein said results include a local history information.

12. The method of claim 7, wherein said results include a global history information.

13. The method of claim 7, further comprising initiating a recovery if said determining shows that said speculative execution was not successful.

14. A system, comprising:
a processor including a fork predictor to issue a prediction whether a fork instruction should be permitted to execute and an execution unit to execute said fork instruction responsive to said prediction, wherein said fork predictor includes an update logic to receive a first calculated determination whether a first one of said speculative threads was executed desirably, and wherein said first calculated determination is performed by executing an update instruction;
a chipset coupled to said processor to convey input-output data from an input-output peripheral; and
an input-output peripheral including an audio input-output device.

15. The system of claim 14, wherein said fork predictor includes a prediction logic to issue said prediction based upon execution history of speculative threads.

16. The system of claim 15, wherein said prediction logic utilizes local history of said speculative threads.

17. The system of claim 15, wherein said prediction logic utilizes global history of said speculative threads.

18. The system of claim 15, further comprising a retirement unit to transfer said first calculated determination to said update logic.

19. The system of claim 15, wherein said update logic is to receive a second calculated determination whether a second one of said speculative threads would have been executed desirably when said second one of said speculative threads was not executed.

20. The system of claim 15 wherein said update instruction is part of a join instruction.

21. A processor, comprising:
means for predicting whether a speculative thread will be desirable;
means for conditionally forking to initiate said speculative thread responsive to said predicting;
means for determining whether said speculative thread was desirable;
means for updating state performing said predicting with results of said determining; and
means for testing whether a processor supports said conditional forking.

22. The processor of claim 21, further comprising means for joining said speculative thread and a master thread when said speculative thread and said master thread are both complete.

23. The processor of claim 22, wherein said means for joining is included in said means for updating.

24. The processor of claim 21, wherein said means for determining includes means for determining whether a non-executed speculative thread would have been desirable.

* * * * *

UNITED STATES PATENT AND TRADEMARK OFFICE
CERTIFICATE OF CORRECTION

PATENT NO. : 7,181,601 B2  Page 1 of 1
APPLICATION NO. : 10/731567
DATED : February 20, 2007
INVENTOR(S) : Rudd et al.

It is certified that error appears in the above-identified patent and that said Letters Patent is hereby corrected as shown below:

Col. 1, at line 14, delete "Modem" and insert --Modern--.
Col. 3, at line 9, delete "14" and insert --114--.

Signed and Sealed this

Third Day of June, 2008

JON W. DUDAS
*Director of the United States Patent and Trademark Office*